(No Model.)

H. C. BONIFACE & I. RICE.
BRACELET.

No. 246,937. Patented Sept. 13, 1881.

WITNESSES:
Carl Karp
Sol. H. Rosenbaum

INVENTOR
Henry C. Boniface
Ignatius Rice
BY Paul Goepel.
ATTORNEY

UNITED STATES PATENT OFFICE.

HENRY C. BONIFACE AND IGNATIUS RICE, OF NEW YORK, N. Y., ASSIGNORS TO RICE & BROTHER, OF SAME PLACE.

BRACELET.

SPECIFICATION forming part of Letters Patent No. 246,937, dated September 13, 1881.

Application filed July 18, 1881. (No model.)

*To all whom it may concern:*

Be it known that we, HENRY C. BONIFACE and IGNATIUS RICE, of the city, county, and State of New York, have invented certain new and useful Improvements in Bracelets, of which the following is a specification.

The hard-rubber bracelets heretofore in use were made of a spring-band with overlapping ends, which had to be opened to be sprung on the wrists. They had the disadvantage that they frequently broke at the front part in spreading them apart in putting them on or removing them, as they were there exposed to the greatest strain.

The object of this invention is to so improve the hard-rubber or other bracelets with overlapping ends that they can be readily put on or removed without danger of breaking; and the invention consists of a bracelet composed of two symmetrical halves, which are connected by a hinge-joint at the front ends, and provided at the overlapping rear ends with an adjustable closing mechanism.

Figure 1:
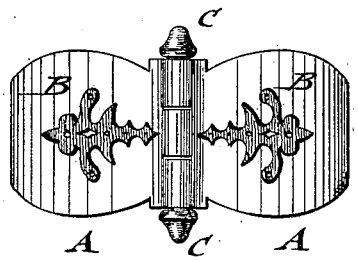
Figure 2:
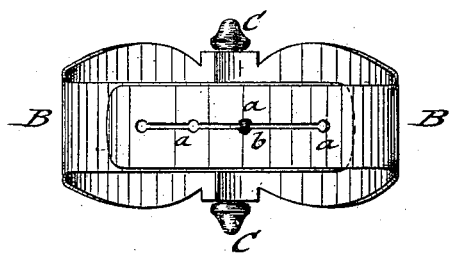
Figure 3:
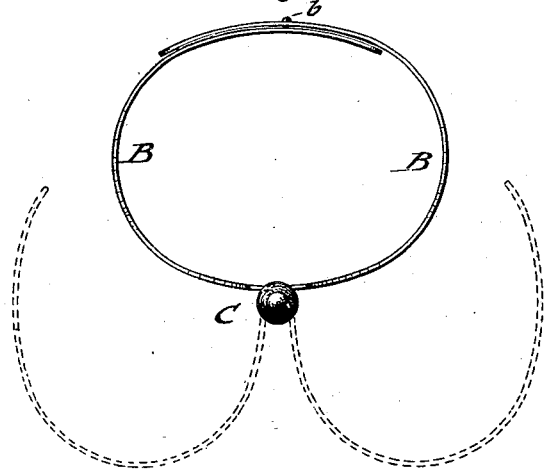

In the accompanying drawings, Figure 1 represents a front elevation, Fig. 2 a rear elevation, of our improved bracelet in closed position, and Fig. 3 is a top view of the same as opened.

Similar letters of reference indicate corresponding parts.

A in the drawings represents a bracelet made of hard rubber or other suitable material, which, instead of being made of one continuous piece, is made of two equal symmetrical sections, B, that are connected at their front ends by a hinge-joint, C. The sections B of the bracelet may be made plain or ornamented, and the hinge-joint of any approved construction, preferably, however, in keeping with the ornamentation. The overlapping rear ends of the sections B are connected by an adjustable locking device—for instance, by arranging in the rear end of one section openings or a slot, *a*, having recesses at suitable distances from each other, which openings or recesses are placed over a headed stud, *b*, of the other section, as shown clearly in Fig. 2.

In place of the locking device shown any other approved locking and adjusting mechanism may, however, be used. The bracelet has the advantage that it may be readily opened without any strain on the front part, as shown in Fig. 3, and fitted to different sizes of wrists by means of the adjustable locking mechanism. In this manner more elaborately-ornamented bracelets of thicker and stronger material may be made, as there is no danger of breakage as with the old style of spring-bracelets, in which the whole strain was thrown on the front part thereof.

Having thus described our invention, we claim as new and desire to secure by Letters Patent—

A bracelet having the sections B B connected at the front by a hinge-joint, C, and arranged to overlap each other at the rear, in combination with mechanism by which the overlapping ends are adjustably connected, substantially as set forth.

In testimony that we claim the foregoing as our invention we have signed our names, in presence of two witnesses, this 15th day of July, 1881.

HENRY C. BONIFACE.
   IGNATIUS RICE.

Witnesses:
 LOUIS P. ELDREDGE,
 DAVID EISENHARDT.